US012559379B2

(12) United States Patent
    Xie et al.

(10) Patent No.: US 12,559,379 B2
(45) Date of Patent: Feb. 24, 2026

(54) WET PROCESS FOR RECOVERING VALUABLE METALS FROM LITHIUM BATTERY

(71) Applicants:GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Yinghao Xie, Foshan (CN); Haijun Yu, Foshan (CN); Aixia Li, Foshan (CN); Xuemei Zhang, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 507 days.

(21) Appl. No.: 18/212,177

(22) Filed: Jun. 20, 2023

(65) Prior Publication Data

US 2023/0331571 A1      Oct. 19, 2023

Related U.S. Application Data

(63) Continuation of application No. PCT/CN2022/092457, filed on May 12, 2022.

(30) Foreign Application Priority Data

Aug. 17, 2021   (CN) .......................... 202110943314.5

(51) Int. Cl.
    *C01D 15/08*        (2006.01)
    *C01G 45/10*        (2006.01)
    (Continued)

(52) U.S. Cl.
    CPC ............. *C01D 15/08* (2013.01); *C01G 45/10* (2013.01); *C01G 51/10* (2013.01); *C01G 53/10* (2013.01);
    (Continued)

(58) Field of Classification Search
    None
    See application file for complete search history.

(56) References Cited

U.S. PATENT DOCUMENTS

| | | | | |
|---|---|---|---|---|
| 11,981,976 B2 * | 5/2024 | He | .......................... | H01M 10/54 |
| 2023/0038978 A1 * | 2/2023 | Gratz | .................... | H01M 10/54 |

FOREIGN PATENT DOCUMENTS

CN        102665912 A        9/2012

OTHER PUBLICATIONS

International Search Report of PCT Patent Application No. PCT/CN2022/092457 issued on Aug. 9, 2022.

* cited by examiner

*Primary Examiner* — John J Figueroa
(74) *Attorney, Agent, or Firm* — Westbridge IP LLC

(57) ABSTRACT

The present disclosure discloses a wet process for recovering valuable metals from a lithium battery. In the method, a waste lithium battery powder is subjected to selective leaching under the condition that a hydrogen sulfide gas is introduced through pressurization, such that $Mn^{2+}$, $Li^+$, and $Al^{3+}$ metal ions enter a first-stage leaching liquor and nickel, cobalt, copper, and iron exist in a first-stage leaching residue in the form of a sulfide; then a pH of the first-stage leaching liquor is adjusted to remove aluminum and manganese, (Continued)

which achieves extremely thorough metal separation and leads to relatively pure products; a first-stage leaching residue is subjected to leaching in an acid liquor under a negative pressure, such that the sulfides of nickel, cobalt, iron, and copper are dissolved in a second-stage leaching liquor, and a hydrogen sulfide gas produced can be recycled in the first-stage leaching procedure through pressurization.

6 Claims, 1 Drawing Sheet

(51) Int. Cl.

| | |
|---|---|
| *C01G 51/10* | (2006.01) |
| *C01G 53/10* | (2006.01) |
| *C22B 3/00* | (2006.01) |
| *C22B 3/22* | (2006.01) |
| *C22B 7/00* | (2006.01) |
| *C22B 15/00* | (2006.01) |
| *C22B 21/00* | (2006.01) |
| *C22B 26/12* | (2006.01) |
| *C22B 47/00* | (2006.01) |
| *H01M 10/54* | (2006.01) |

(52) U.S. Cl.

CPC ............... *C22B 3/22* (2013.01); *C22B 7/007* (2013.01); *C22B 15/0071* (2013.01); *C22B 21/0023* (2013.01); *C22B 23/043* (2013.01); *C22B 26/12* (2013.01); *C22B 47/00* (2013.01); *H01M 10/54* (2013.01)

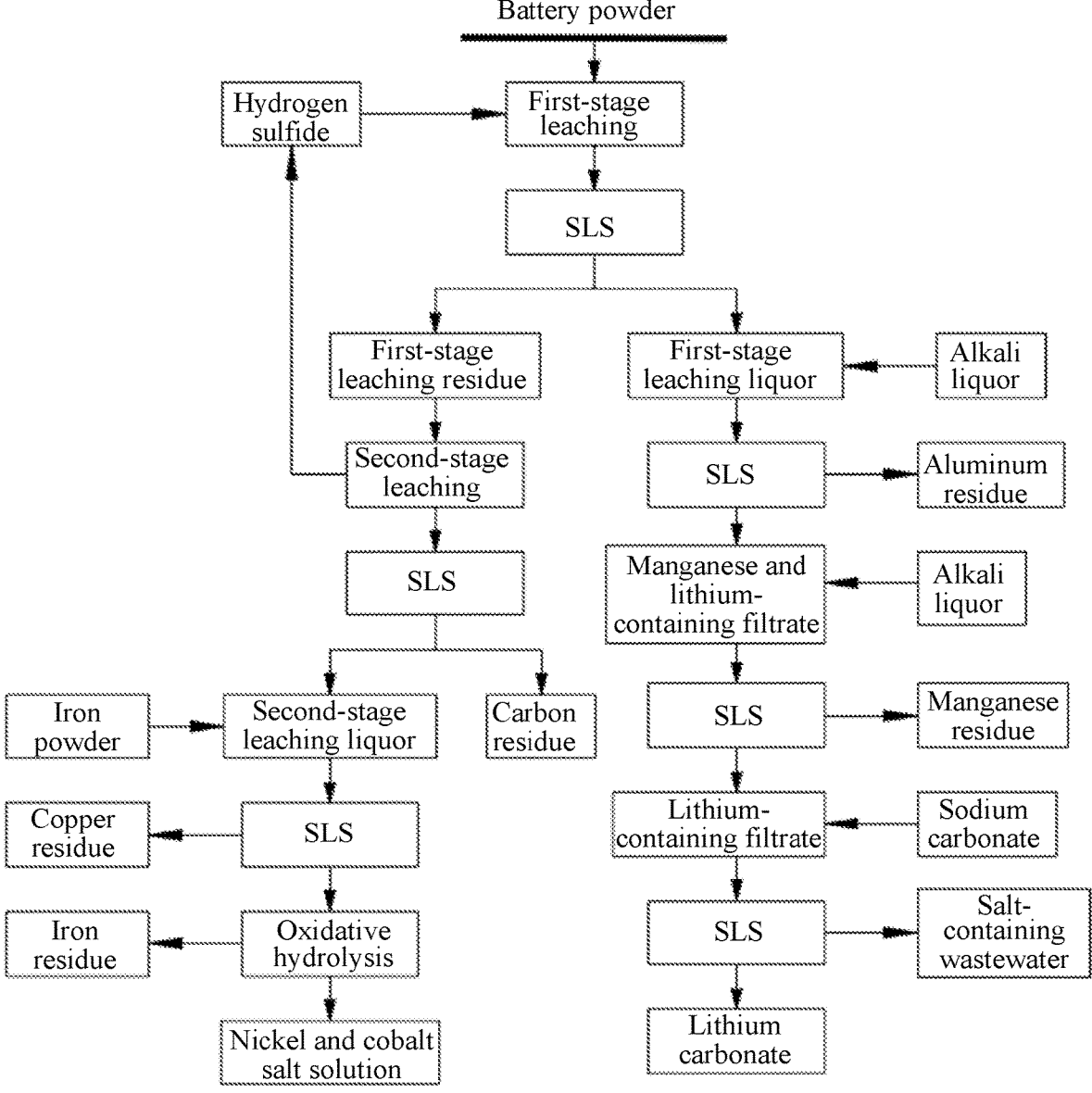

WET PROCESS FOR RECOVERING VALUABLE METALS FROM LITHIUM BATTERY

CROSS-REFERENCE TO RELATED APPLICATIONS

The present application is a continuation application of PCT application No. PCT/CN2022/092457 filed on May 12, 2022, which claims the benefit of Chinese Patent Application No. 202110943314.5 filed on Aug. 17, 2021. The contents of all of the aforementioned applications are incorporated by reference herein in their entirety.

TECHNICAL FIELD

The present disclosure belongs to the technical field of lithium battery recycling, and specifically relates to a wet process for recovering valuable metals from a lithium battery.

BACKGROUND

Lithium-ion batteries (LIBs) are widely used in portable electronic devices such as mobile phones, mobile power supplies, and notebooks due to advantages of high energy density, high voltage, excellent cycling performance, low self-discharge, high charge-discharge efficiency, and the like. Moreover, with the continuous development of new energy automobile industry, the market demand for LIB s is increasing.

However, power batteries generally have a service life of no more than 10 years, and will be scrapped at the end of service life. Scrapped LIBs include a large amount of harmful and valuable metals, and thus will cause great pollution and damage to the natural environment if discarded at will. Therefore, the recycling of scrapped LIB plays a positive role in the environmental protection and sustainable development, and the recovery of valuable elements from a cathode material of scrapped LIB can make full use of urban mining resources and relieve the pressure of natural resource shortage.

An active material of a negative electrode in LIB is graphite, and an active material of a positive electrode is mainly $LiCoO_2$, $LiNi_xCo_yMn_zO_2$ (where x+y+z=1), $LiMn_2O_4$, or other lithium transition metal oxides (LTMOs). A positive electrode of LIB is fabricated as follows: thoroughly mixing a positive electrode active material (LTMO), a small amount of a conductive additive (generally acetylene black), and an organic binder, and coating a resulting mixture uniformly on an aluminum foil current collector to form the positive electrode.

The leaching method is a traditional method for recycling a cathode material of scrapped LIB, and mainly includes the two steps of pretreatment and acid leaching. In a leaching process, a scrapped LIB first undergoes a series of operations such as disassembly, crushing, sieving, sorting, magnetic separation, primary grinding, cathode material separation, and secondary grinding, and then an inorganic acid (strong acids such as hydrochloric acid, nitric acid, and sulfuric acid) is added as a leaching agent and a specified amount of hydrogen peroxide is also added to extract lithium, cobalt, nickel, and manganese from a positive electrode active material.

In the leaching process of the traditional method, all dissoluble metal ions are leached out, and then a series of impurity removal procedures are conducted to obtain a metal salt solution with high purity. In the impurity removal process, the separation of some metal ions requires multi-stage extraction, and the extraction process is long, which leads to high metal loss rate and is time-consuming and labor-intensive.

SUMMARY

The present disclosure is intended to solve at least one of the technical problems existing in the prior art. Because of this, the present disclosure provides a wet process for recovering valuable metals from a lithium battery. With the method, a pure nickel and cobalt sulfate mixed solution, a manganese sulfate solution, and lithium carbonate can be obtained without requiring an organic solvent, which can be directly used as synthetic raw material for a lithium battery cathode material precursor and sintering raw materials for a cathode material.

According to one aspect of the present disclosure, a wet process for recovering valuable metals from a lithium battery is provided, including the following steps:

subjecting a waste lithium battery powder to first-stage leaching in a first acid liquor introduced with a hydrogen sulfide gas, and conducting solid-liquid separation (SLS) to obtain a first-stage leaching residue and a first-stage leaching liquor;

adjusting a pH of the first-stage leaching liquor with an alkali liquor to sequentially remove aluminum and manganese to obtain a lithium-containing filtrate; and adding a second acid liquor to the first-stage leaching residue for second-stage leaching, and conducting SLS to obtain a second-stage leaching liquor with nickel and cobalt ions.

It should be noted that the waste lithium battery powder includes different transition metals due to different positive electrode active materials; and in addition to positive electrode active materials, the waste lithium battery powder usually includes metal impurities of aluminum, iron, and/or copper.

The term "first acid liquor introduced with a hydrogen sulfide gas" means that a hydrogen sulfide gas is continuously introduced into the first acid liquor during the first-stage leaching process.

In some implementations of the present disclosure, the first acid liquor is a sulfuric acid solution.

In some implementations of the present disclosure, a process of sequentially removing aluminum and manganese includes: adjusting the pH with the alkali liquor first to 5.0 to 5.5 and conducting SLS to obtain a filtrate containing manganese and lithium and an aluminum residue, and further adjusting the pH with the alkali liquor to 10.5 to 11.0, and conducting SLS to obtain a lithium-containing filtrate and a manganese residue.

In some preferred implementations of the present disclosure, the manganese residue can be dissolved in sulfuric acid to prepare manganese sulfate, which can be directly used as a synthetic raw material for a lithium battery cathode material precursor.

In some implementations of the present disclosure, the alkali liquor is at least one from the group consisting of sodium hydroxide and potassium hydroxide.

In some implementations of the present disclosure, the second-stage leaching liquor is also subjected to the following copper and iron removal procedures: adding an iron powder to the second-stage leaching liquor, and conducting SLS to remove a copper residue, and adding an oxidant to the second-stage leaching liquor with copper removed, adjusting a pH to 3.5 to 4.0, and conducting SLS to remove an iron residue to obtain a nickel and cobalt salt solution.

In some implementations of the present disclosure, a solid-to-liquid ratio of the waste lithium battery powder to the first acid liquor is 100 to 250 g/L; and preferably, the first-stage leaching is conducted at a temperature of 20° C. to 90° C., a pH of 3.0 to 3.5, and a pressure of 0 MPa to 6 MPa.

In some implementations of the present disclosure, sodium carbonate is added to the lithium-containing filtrate, and SLS is conducted to obtain lithium carbonate and salt-containing wastewater. Lithium carbonate can be directly used as a sintering raw material for a lithium battery cathode material.

In some implementations of the present disclosure, a solid-to-liquid ratio of the first-stage leaching residue to the second acid liquor is 200 to 500 g/L; preferably, the second acid liquor has a concentration of 0.1 mol/L to 6.0 mol/L; and preferably, the second-stage leaching is conducted at a temperature of 30° C. to 180° C. and pressure of −0.2 MPa to −0.01 MPa. Preferably, the second acid liquor is a sulfuric acid solution. Preferably, nitrogen can be introduced to relieve the negative pressure in the second-stage leaching to keep pressure stable, and a hydrogen sulfide gas generated during the process is absorbed by sodium hydroxide to prepare sodium sulfide.

In some implementations of the present disclosure, hydrogen sulfide produced in the second-stage leaching is subjected to recycle use in the first-stage leaching.

In some implementations of the present disclosure, a molar ratio of the added iron powder to copper ions in the second-stage leaching liquor is (1.0-1.1):1.

In some implementations of the present disclosure, the oxidant is one or more from the group consisting of oxygen, hydrogen peroxide, and persulfuric acid.

In some implementations of the present disclosure, after the oxidant is added, the pH is adjusted using one or more from the group consisting of a hydroxide, a carbonate, and an oxide of nickel or cobalt to remove iron.

According to a preferred implementation of the present disclosure, the present disclosure at least has the following beneficial effects:

The present disclosure includes the following three steps: (1) selective leaching is conducted under the conditions that an acid liquor is used to control a pH and a hydrogen sulfide gas is introduced through pressurization, such that Mn2+, Li⁺, and Al³⁺ metal ions enter a first-stage leaching liquor and nickel, cobalt, copper, and iron exist in a first-stage leaching residue in the form of a sulfide, which consumes only a small amount of sulfuric acid; (2) then a pH of the first-stage leaching liquor is first adjusted to remove aluminum and then adjusted to obtain a pure manganese hydroxide manganese residue, which achieves extremely thorough metal separation and leads to relatively pure products that can be directly used for subsequent processing and production; and (3) a first-stage leaching residue is subjected to leaching in an acid liquor under a negative pressure, such that the sulfides of nickel, cobalt, iron, and copper are dissolved in a second-stage leaching liquor, and a hydrogen sulfide gas produced can be recycled in the first-stage leaching procedure through pressurization, which makes the entire reaction process consume a very small amount of hydrogen sulfide; and copper and iron are removed by taking advantage of the easy replacement of copper and the easy hydrolysis of iron to obtain a relatively pure nickel and cobalt salt mixed solution, which can be directly used for the synthesis of a cathode material precursor.

BRIEF DESCRIPTION OF THE DRAWINGS

The present disclosure is further described below with reference to accompanying drawings and examples.

The sole FIGURE is a schematic diagram illustrating a process flow of Example 1 of the present disclosure.

DETAILED DESCRIPTION

The concepts and technical effects of the present disclosure are clearly and completely described below in conjunction with examples, so as to allow the objectives, features and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present disclosure.

Example 1

A wet process for recovering valuable metals from a lithium battery was provided, and as shown in the sole FIGURE, a specific process was as follows:

A waste battery powder had the following metal contents: nickel: 16.76%, cobalt: 10.33%, manganese: 7.52%, lithium: 4.01%, iron: 1.13%, aluminum: 1.28%, and copper: 1.63%; and valuable metals were recovered through the following steps:

100 g of a collected waste lithium battery powder was subjected to first-stage leaching in a sulfuric acid solution introduced with a hydrogen sulfide gas for 7 h at a solid-to-liquid ratio of 250 g/L, a temperature of 20° C., a pH of 3.0, and a pressure of 3 MPa; and then SLS was conducted to obtain a L first-stage leaching residue and 400 m of a first-stage leaching liquor, which would be treated separately.

(1) Preparation of Lithium Carbonate from the First-Stage Leaching Liquor:

A. Sodium hydroxide was added to the first-stage leaching liquor to adjust a pH to 5.0 to 5.5, and then SLS was conducted to obtain a manganese and lithium-containing filtrate and an aluminum residue.

B. Sodium hydroxide was further added to the manganese and lithium-containing filtrate to adjust a pH to 10.5 to 11.0, then SLS was conducted to obtain a lithium-containing filtrate and a manganese residue, and the manganese residue was dissolved in sulfuric acid to prepare manganese sulfate.

C. Sodium carbonate was added to the lithium-containing filtrate, and then SLS was conducted to obtain lithium carbonate and salt-containing wastewater.

(2) Preparation of a Nickel and Cobalt Salt Solution from the First-Stage Leaching Residue:

A. The first-stage leaching residue was subjected to second-stage leaching for 7 h in sulfuric acid at a solid-to-liquid ratio of 200 g/L, a sulfuric acid concentration of 5 mol/L, a temperature of 90° C., and a negative pressure of −0.1 MPa; and then SLS was conducted to obtain 400 mL of a second-stage leaching liquor and a carbon residue, where hydrogen sulfide generated under the negative pressure was recycled in the first-stage leaching process.

B. An iron powder was added to the second-stage leaching liquor, and after a reaction was completed, SLS was conducted to remove a copper residue, where a molar ratio of the added iron powder to copper ions was 1.1:1.

C. Hydrogen peroxide and nickel hydroxide were added to the second-stage leaching liquor with copper removed, a pH was adjusted to 3.5 to 4.0, and a resulting iron residue was removed to obtain a pure nickel and cobalt sulfate mixed solution.

In the first-stage leaching liquor, lithium has a content of 9.96 g/L, manganese has a content of 18.33 g/L, and aluminum has a content of 3.16 g/L, indicating a lithium leaching rate of about 99.35%, a manganese leaching rate of about 97.5%, and an aluminum leaching rate of about 98.75%; a mass of the first-stage leaching residue accounts for about 80% of a total mass of the battery powder; and in the second-stage leaching liquor, nickel has a content of 41.32 g/L, cobalt has a content of 25.61 g/L, iron has a content of 2.76 g/L, and copper has a content of 3.36 g/L, indicating a nickel leaching rate of 98.62%, a cobalt leaching rate of about 99.17%, an iron leaching rate of about 97.70%, and a copper leaching rate of about 82.45%.

Example 2

A wet process for recovering valuable metals from a lithium battery was provided, and a specific process was as follows:

A waste battery powder had the following metal contents: nickel: 16.76%, cobalt: 10.33%, manganese: 7.52%, lithium: 4.01%, iron: 1.13%, aluminum: 1.28%, and copper: 1.63%; and valuable metals were recovered through the following steps:

100 g of a collected waste lithium battery powder was subjected to first-stage leaching in a sulfuric acid solution introduced with a hydrogen sulfide gas for 7 h at a solid-to-liquid ratio of 250 g/L, a temperature of 60° C., a pH of 3.0, and a pressure of 6 MPa; and then SLS was conducted to obtain a first-stage leaching residue and 400 mL of a first-stage leaching liquor, which would be treated separately.

(1) Preparation of Lithium Carbonate from the First-Stage Leaching Liquor:

A. Sodium hydroxide was added to the first-stage leaching liquor to adjust a pH to 5.0 to 5.5, and then SLS was conducted to obtain a manganese and lithium-containing filtrate and an aluminum residue.

B. Sodium hydroxide was further added to the manganese and lithium-containing filtrate to adjust a pH to 10.5 to 11.0, then SLS was conducted to obtain a lithium-containing filtrate and a manganese residue, and the manganese residue was dissolved in sulfuric acid to prepare manganese sulfate.

C. Sodium carbonate was added to the lithium-containing filtrate, and then SLS was conducted to obtain lithium carbonate and salt-containing wastewater.

(2) Preparation of a Nickel and Cobalt Salt Solution from the First-Stage Leaching Residue:

A. The first-stage leaching residue was subjected to second-stage leaching for 7 h in sulfuric acid at a solid-to-liquid ratio of 200 g/L, a sulfuric acid concentration of 3 mol/L, a temperature of 30° C., and a negative pressure of −0.2 MPa; and then SLS was conducted to obtain 400 mL of a second-stage leaching liquor and a carbon residue, where hydrogen sulfide generated under the negative pressure was recycled in the first-stage leaching process.

B. An iron powder was added to the second-stage leaching liquor, and after a reaction was completed, SLS was conducted to remove a copper residue, where a molar ratio of the added iron powder to copper ions was 1.0.5:1.

C. Persulfuric acid and cobalt hydroxide were added to the second-stage leaching liquor with copper removed, a pH was adjusted to 3.5 to 4.0, and a resulting iron residue was removed to obtain a pure nickel and cobalt sulfate mixed solution.

In the first-stage leaching liquor, lithium has a content of 9.98 g/L, manganese has a content of 18.55 g/L, and aluminum has a content of 3.19 g/L, indicating a lithium leaching rate of about 99.55%, a manganese leaching rate of about 98.67%, and an aluminum leaching rate of about 99.69%; a mass of the first-stage leaching residue accounts for about 80% of a total mass of the battery powder; and in the second-stage leaching liquor, nickel has a content of 41.40 g/L, cobalt has a content of 25.58 g/L, iron has a content of 2.74 g/L, and copper has a content of 3.52 g/L, indicating a nickel leaching rate of 98.81%, a cobalt leaching rate of about 99.05%, an iron leaching rate of about 96.99%, and a copper leaching rate of about 86.38%.

The examples of present disclosure are described in detail with reference to the accompanying drawings, but the present disclosure is not limited to the above examples. Within the scope of knowledge possessed by those of ordinary skill in the technical field, various changes can also be made without departing from the purpose of the present disclosure. In addition, the examples in the present disclosure or features in the examples may be combined with each other in a non-conflicting situation.

The invention claimed is:

1. A wet process for recovering valuable metals from a lithium battery, comprising the following steps:

subjecting a waste lithium battery powder to first-stage leaching in a first acid liquor introduced with a hydrogen sulfide gas, and conducting solid-liquid separation to obtain a first-stage leaching residue and a first-stage leaching liquor; wherein a solid-to-liquid ratio of the waste lithium battery powder to the first acid liquor is 100 to 250 g/L; and the first-stage leaching is conducted at a temperature of 20-90° C., a pH of 3.0-3.5, and a pressure of 0-6 MPa;

adjusting the pH of the first-stage leaching liquor with an alkali liquor to sequentially remove aluminum and manganese to obtain a lithium-containing filtrate; wherein a process of the sequentially removing aluminum and manganese is: adjusting the pH with the alkali liquor to 5.0-5.5 first, and conducting solid-liquid separation to obtain a filtrate containing manganese and lithium, and an aluminum residue; and further adjusting the pH of the filtrate with the alkali liquor to 10.5-11.0, and conducting solid-liquid separation to obtain a lithium-containing filtrate and a manganese residue;

adding sodium carbonate to the lithium-containing filtrate, then conducting a solid-liquid separation to obtain lithium carbonate and a salt-containing wastewater;

adding a second acid liquor to the first-stage leaching residue for second-stage leaching, and conducting a solid-liquid separation to obtain a second-stage leaching liquor containing nickel and cobalt ions;

adding iron powder to the second-stage leaching liquor, conducting a solid-liquid separation to remove a copper residue; adding an oxidant to a resulting copper-removing second-stage leaching liquor, adjusting the pH to 3.5-4.0, and conducting a solid-liquid separation to remove an iron residue to obtain a solution of nickel salt and cobalt salt.

2. The method according to claim 1, wherein a solid-to-liquid ratio of the first-stage leaching residue to the second acid liquor is 200 to 500 g/L; the second acid liquor has a concentration of 0.1-6.0 mol/L; and the second-stage leaching is conducted at a temperature of 30-180° C. and a pressure of –0.2~–0.01 MPa.

3. The method according to claim 1, wherein hydrogen sulfide produced in the second-stage leaching is subjected to recycle use in the first-stage leaching.

4. The method according to claim 3, wherein a molar ratio of the iron powder to the copper ions in the second-stage leaching liquor is (1.0-1.1):1.

5. The method according to claim 3, wherein the oxidant is one or more selected from the group consisting of oxygen, hydrogen peroxide, and persulfuric acid.

6. The method according to claim 3, wherein after the oxidant is added, the pH is adjusted using one or more selected from the group consisting of a hydroxide, a carbonate, and an oxide of nickel or cobalt to remove iron.

\* \* \* \* \*